FIG. 1.

INVENTORS
PAUL C. HETZINGER &
ALTEN E. WHITECAR

INVENTORS
PAUL C. HETZINGER &
ALTEN E. WHITECAR

ATTORNEYS

Sept. 29, 1970  P. C. HETZINGER ET AL  3,531,354
DEVICE FOR INSERTING AN ARTICLE BETWEEN A
CONTAINER AND A LABEL
Filed Oct. 13, 1965  6 Sheets-Sheet 6

INVENTORS
PAUL C. HETZINGER &
ALTEN E. WHITECAR
BY

ATTORNEYS

United States Patent Office 3,531,354
Patented Sept. 29, 1970

3,531,354
DEVICE FOR INSERTING AN ARTICLE BETWEEN A CONTAINER AND A LABEL
Paul C. Hetzinger, Ardsley, Pa., and Alten E. Whitecar, Westville, N.J., assignors to Smith Kline & French Laboratories, Philadelphia, Pa., a corporation of Pennsylvania
Filed Oct. 13, 1965, Ser. No. 495,652
Int. Cl. B65c 9/08
U.S. Cl. 156—383                    5 Claims

ABSTRACT OF THE DISCLOSURE

A labeling machine having a mechanism for inserting an article between a container and a label which is applied to the container, which mechanism comprises a reciprocating means which picks up the article from a supply thereof, moves it to a position close to the surface of the container and holds it in this position as the label is applied to the container, whereby the article is inserted and retained between the label and the container.

---

This invention relates to means for securing an article to a container and particularly to means for inserting an article between a container and a label for retention therebetween.

It is frequently desired to supply an article along with a filled container which is accessible without the necessity of opening the container. Typical examples are instruction sheets, premiums, tokens, product samples and money.

Also in those instances in which the container is distributed enclosed in a carton or other receptacle as is often the case with certain pharmaceuticals it is frequently desired to eliminate the operation of placing the article in such carton as a labor saving measure.

For purposes of illustration, the invention will be described as it relates to a bottle or other container for medicinal tablets, capsules or the like with which it is desired to supply informative literature to be read by the dispensing pharmacist only, or also by the ultimate purchaser of the medicament.

In accordance with this invention, an article such as a piece of literature or otherwise can be removably secured, or, if desired, nonremovably secured, to a container between the container and a label applied thereto.

It is therefore a major object of this invention to provide means for securing an article to a container between the container and a label applied thereto.

This and further objects of the invention will be made apparent on reading the following description in conjunction with the drawings, in which.

In the drawings, the numeral 11 designates generally a bottle or other container deposited on a suitable support 12 at the label applying station 13 of a label applying machine 10 of any type of which the label applying machines of U.S. Pats. 2,227,816 and 2,684,775 and their many modifications are typical.

In such a machine there is provided a transfer means for the labels in the form of a suction head illustrated at 14 having suction portions 14A and 14B which successively carry labels, (a label being illustrated at 16), supplied from a source of supply illustrated at 18 to the label applying station 13 of the machine 10. At the label applying station the suction head portion 14B is lowered to apply or drop the label carried thereby onto the container 11, the suction in the head 14 being so controlled as to be released at an appropriate time to release the label from said head 14, accompanied, if desired, through suitable valve mechanism, by moderate air pressure in said head 14 to assist in said release.

The mechanism for accomplishing this operation may include a carriage 20 slidably mounted on a rail 22 and reciprocated on such rail 22 by mechanism exemplified by the rod 24 and the arm 26, rod 24 being pivotally connected at 28 with the carriage 20 and at 30 with the arm 26. A member or plunger 32 is mounted on carriage 20 for vertical reciprocation by suitable means in properly timed relation with the associated elements, suction head 14 being attached at the lower end of plunger 32.

In operation carriage 20 is reciprocated on rail 22 to carry the suction head 14A portion between the pickup station 34, where a label is picked up, and an intermediate station and to carry suction head portion 14B between the intermediate station and the label applying station 13 where the label is applied or dropped onto the container for which it is intended, such as the bottle 11.

As is well known, plunger 32 may be operatively controlled to correspondingly control the operative steps of suction head 14.

The labels may be of any desired form or dimensions and may have any suitable type of adhesive coating on one surface thereof. As will be seen hereafter, however, in order to obtain superior results in accordance with the invention herein and to be hereinafter particularly described, the adhesive coating on the label is preferably comprised of a material activated by heat, that is, a material that is in nonadhesive state at ordinary temperatures, but in adhesive or sticky state at suitable elevated temperatures, of which various varieties are well-known in the art.

As illustrated, the labels are fed in known manner in the form of a continuous web 36 which is wound into a roll 38 so that the surfaces thereof bearing the adhesive, specially arranged in the preferred practice of the invention as will be hereinafter more particularly described, are disposed to the periphery of such roll. As shown, roll 38 is mounted on a shaft 40 arranged in a manner to permit roll 38 to unwind during the operation of the machine.

Web 36 is fed towards the pickup station 34 as by feed rollers 42 operated intermittently in steps dependent upon and corresponding to the longitudinal dimension of the labels. At the pickup station 34 the machine is provided with suitable operating means 46 to separate the individual labels 16 from the web 36 when a label 16 is properly positioned at the pickup station. Each label 16 is picked up at station 34 and deposited at an intermediate station 44 by suction head portion 14A. Suction head portion 14B picks up a label at station 44 and deposits it on a container 11. The suction in the head 14 is controlled by properly timed valving mechanism of any suitable type.

Suction head 14 carries a heating device comprised of one or more electrical resistance elements which are mounted in such head and which are connected with a source of electricity by wires 48 so that by the time a label has been carried by such head to the label applying station 13, the coating on such label will be adhesively activated.

As is well known, intermediate station 44 may be provided with a chamber with appropriate perforations in its upper surface, said chamber being connected to suitable means for producing a condition of suction after a label has been deposited thereon, and for producing a condition of moderate air pressure for urging or blowing, at the appropriate time, a label into contact with suction head portion 14B, i.e. when the latter is positioned in an at-rest position just above the label.

After a label 16 has been deposited on a container 11 at the label applying station 13, and suction head 14 has moved back out of the way, means come into operation to complete the application of such label to the container.

The support 12 may be mounted on the labeling machine in any desired manner such as shown. Cooperating with support 12 is a pressure member 50 depending from a member 52 which is vertically actuated in operative synchronism with the other parts of the machine in any suitable manner, as by the mechanism described and illustrated in the above mentioned patents. The pressure member 50 is provided with a resilient contact member or wiper 54 which may be of any suitable material such as sponge rubber.

It will be understood that in the operation of the machine so far described, and after a label has been deposited on the container 11 by the suction head 14, the member 52 is moved downwardly to thereby move resilient contact member or wiper 54 of pressure member 50 into engagement with the container 11. During this phase of the operation the label 16 is firmly pressed throughout its entire area by resilient contact member or wiper 54 into engagement with the label receiving surface of the container 11.

When the pressure member 50 has been withdrawn, the labelled container 11 may be removed from the support 12, and a new container substituted for the next succeeding cycle of the machine.

Vertical actuation or reciprocation of member 52, the reciprocation of carriage 20 on rail 22, and the vertical actuation or reciprocation of plunger 32 may be accomplished in known manner such as described in the above mentioned patents.

As illustrated in the drawings, lever 56 is loosely mounted on shaft 58 and is connected to one end of an operating lever 60 as by angular bracket 61. (See FIG. 1.) The lever 60 at its lower end is appropriately connected for vertical actuation or reciprocation to cam 62 fixed on shaft 64 rotatably mounted in bearings on the frame of the machine.

Member or plunger 52 is vertically reciprocated in proper timed relation with the other elements of the machine by lever 60 through lever 56 which has its free end 66 projecting into a slot 68 at the upper end of plunger 52, plunger 52 in turn passing through and guided by guideway 70 suitably mounted on the machine 10.

It has been brought out above that the label transfer means includes a carriage 20 slidably mounted upon horizontal guide rail 22 supported on the frame of the machine 10 in any convenient manner, and that carriage 20 is reciprocated on rail 22 by means of an arm 26.

Referring now to the actuation of arm 26, it is to be understood that it is fixed to shaft 58, and that carriage 20 is reciprocated on rail 22 by rocking shaft 58.

The mechanism whereby shaft 58 is rocked may comprise a gear segment 72 fixed upon the shaft 58 and meshing with a rack 74 vertically movable in a guideway 76 suitably mounted on the frame of the machine 10. The rack 74 forms part of an operating member 78 which is formed at its lower end in a manner to straddle shaft 64 and carries a roller or cam follower 80 in operative engagement with an internal cam 82 fixed upon the shaft 64. Cam 82 is of such form as to vertically reciprocate the rack 74 and rock the gear segment 72 and shaft 58 in timed relationship with the other elements of the machine 10.

As brought out above, member or plunger 32 which has suction head 14 attached to its lower end, is mounted for vertical reciprocation on carriage 20 in timed relation with associated elements. Vertical reciprocation of member 32 in properly timed relation with the other parts of the machine 10 may be accomplished in any of the ways described in said above mentioned patents and may include lever 84 pivoted at 86 on the frame of the machine 10. The inner end of lever 84 may be mechanically connected and associated with the upper end of member or plunger 32 in a variety of ways such as disclosed in said patents, and likewise the outer end of lever 84 may be so operatively connected such as pivotally to an operating member 88 as at 90. Operating member 88 is slotted at its lower end to accommodate shaft 64, and is provided at its lower end with a roller or cam follower 92 which is in external rolling engagement with a suitable cam 94 fixed upon shaft 64.

Provision is frequently made in machines of this type for the control of air pressure at a point or a plurality of points such as in the suction head etc., and at times involves switching between reduced (vacuum) atmospheric and/or elevated pressures as required, and in appropriate timed relation. Valve mechanism for such switching purposes is illustrated at 96, and may take any form and construction suitable to the requirements. Valve mechanism 96 is shown as having an operating lever 98 pivotally connected at 100 to operating member 102.

Member 102 is forked at its lower end to straddle shaft 64. Member 102 is further slidably guided on operating member 88 by means of a guide bearing 106. Member 102 at its lower end carries a roller or cam follower 108 which is in operative engagement with external cam 110 fixed on shaft 64.

Cam follower 92 is held in contact with cam 94 and cam follower 108 is held in contact with cam 110 by means of spring 112 attached to operating member 88 at 114 and to operating member 102 at 116.

Shaft 64 has fixed thereto a gear 118 which meshes with a pinion 120 fixed on the shaft of electric motor 122 which exemplifies the power whereby the entire machine is actuated.

Having described a typical machine of the prior art to which the invention may be applied and with which the invention may be employed in combination. the particular description will now proceed in connection with the features of the invention.

Figure 1:
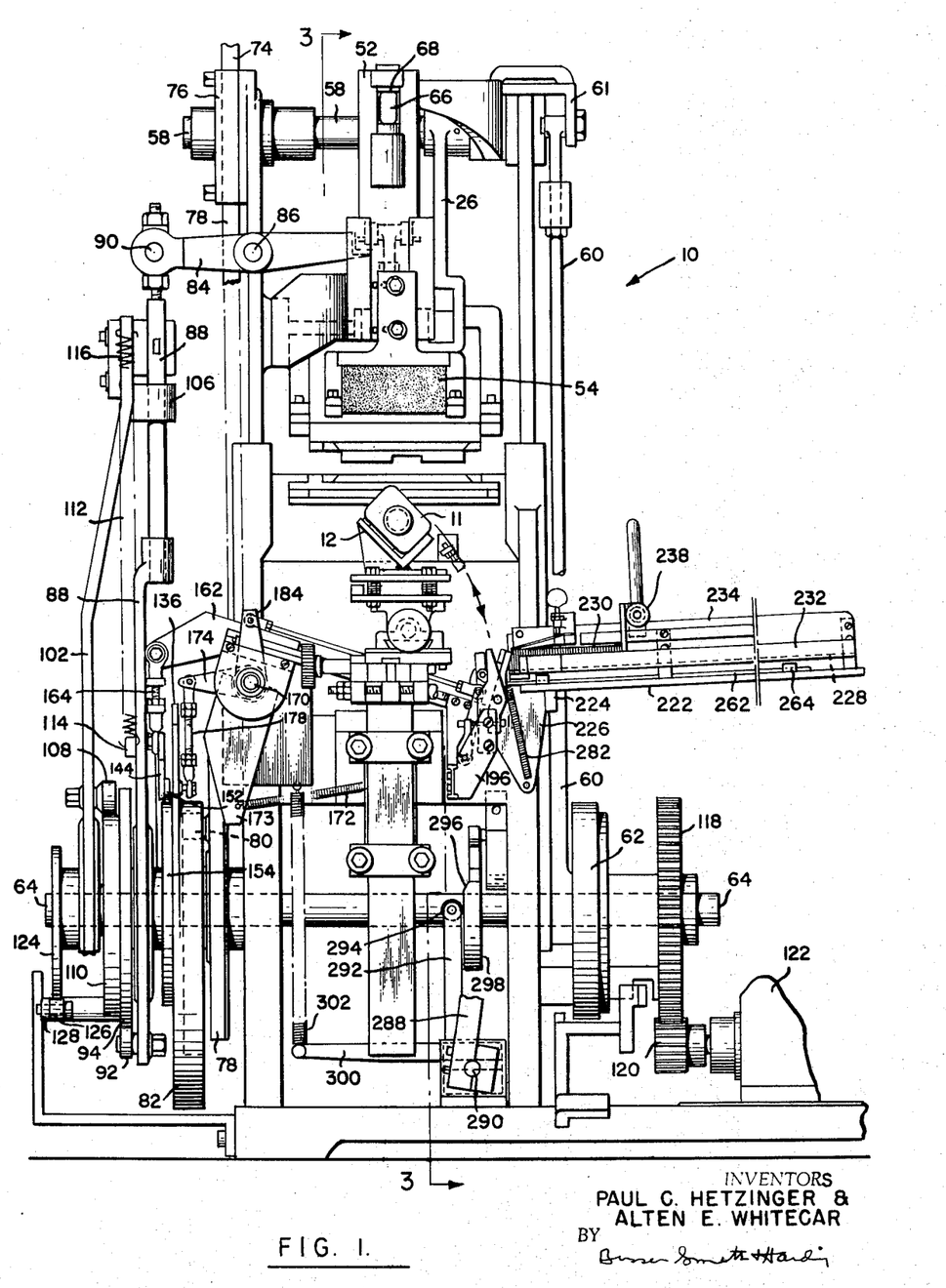
FIG. 1 is an elevation of a machine for applying labels to containers having incorporated therewith means in accordance with the invention.
Figure 2:
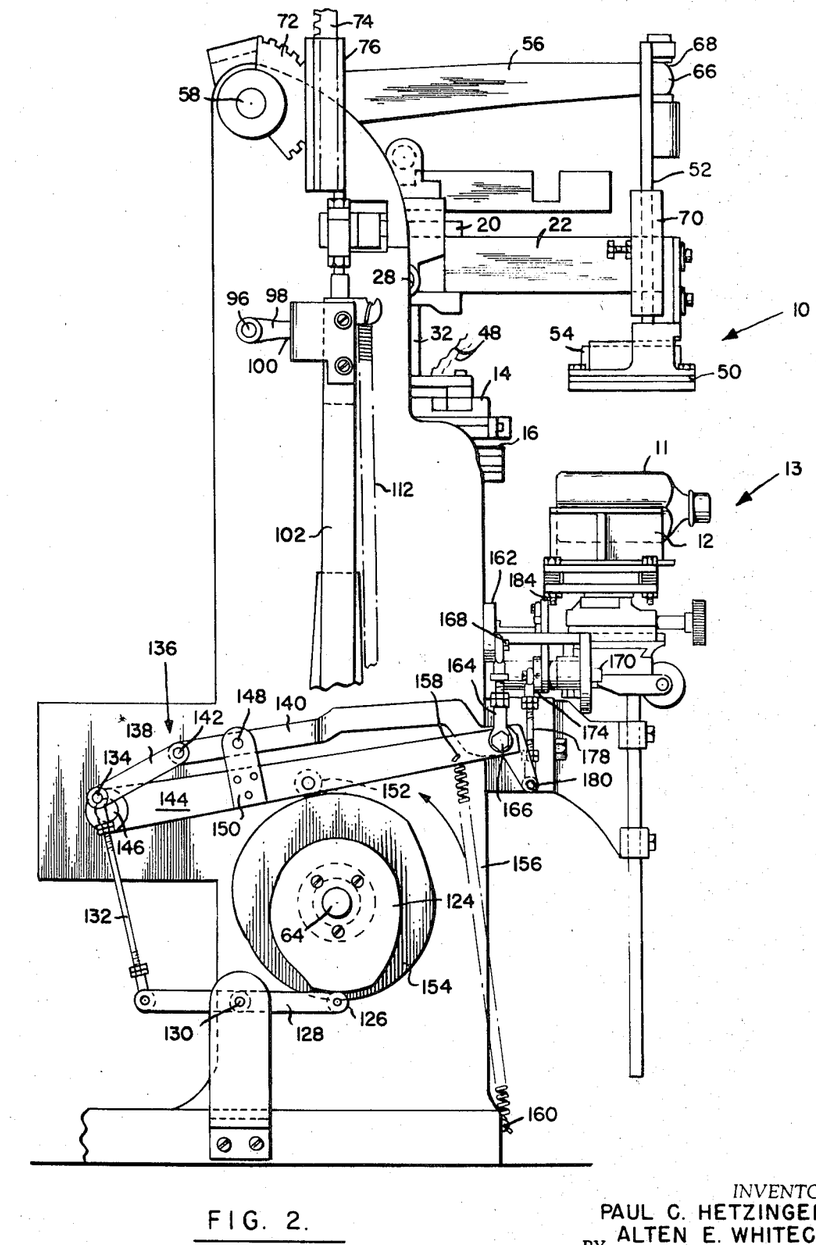
FIG. 2 is an end view from the left of the machine as seen in FIG. 1.

Cam 124 is fixed to shaft 64 and is in operative engagement with cam follower or roller 126 positioned on one end of lever 128. Lever 128 is pivoted or fulcrumed at 130 on the frame of machine 10, and on its other end is pivoted to link 132. Link 132 is pivoted at 134 to member 136. Member 136 is comprised of two parts, namely, part 138 and part 140 fixedly connected together at 142 in offset or crossover arrangement so that part 138 is at the front of member 144, the latter pivoted at 146 on the frame of machine 10, as seen in FIG. 2, and so that part 140 is at the rear of member 144. In other words, member 136 crosses over the top of member 144 at 142 away from the viewer in FIG. 2, with its two parts rigidly connected to each other through an offset at 142. Member 136 is pivoted or fulcrumed at 148 on member 150 secured to member 144, the construction being such as to space members 136 and 144 from each other as seen in FIG. 1.

Mounted on member 144 is cam follower or roller 152 which is held in operative engagement with cam 154 fixed on shaft 64 by means of spring 156 attached to member 144 as at 158 and to the frame of machine 10 as at 160.

Figure 6:
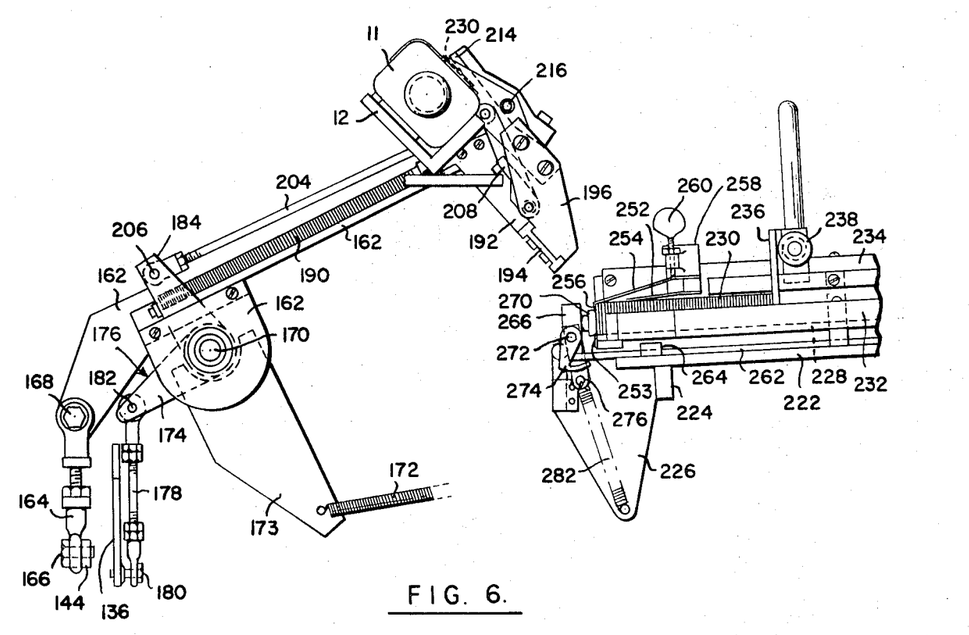
FIG. 6 is an elevation partly broken of the mechanism of FIG. 4 in article delivery position.

As best seen in FIG. 6, member 144 is operatively connected to reciprocating arm 162 through link 164 pivoted to member 144 as at 166 and to arm 162 as at 168. Arm 162 is mounted for oscillation on shaft 170 fixed to the frame of machine 10 and extending laterally outwardly therefrom as seen in FIG. 2. Arm 162 is urged in counterclockwise direction as seen in FIG. 6 by virtue of spring 172 attached at one end to member 173 fixed to arm 162 and projecting downwardly therefrom in the manner of an arm of a bell crank, the other end of spring 172 being attached to the frame of machine 10 at a suitable point (FIG. 1).

Figure 4:
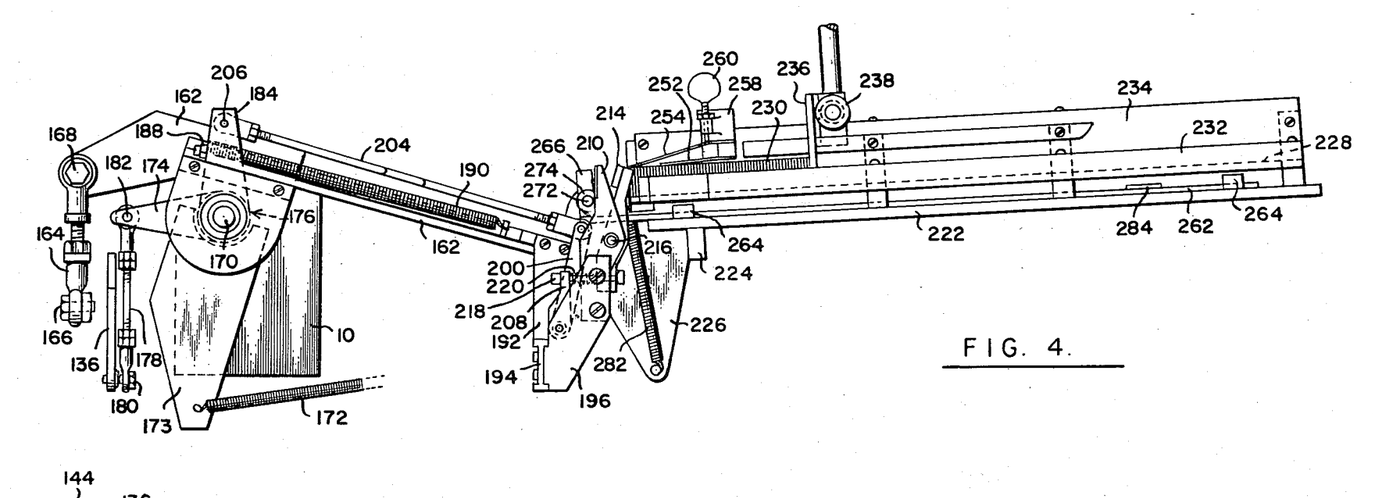
FIG. 4 is an elevation illustrating details of mechanism for delivering articles to the label applying station, said mechanism being shown in article pickup position.
Figure 5:
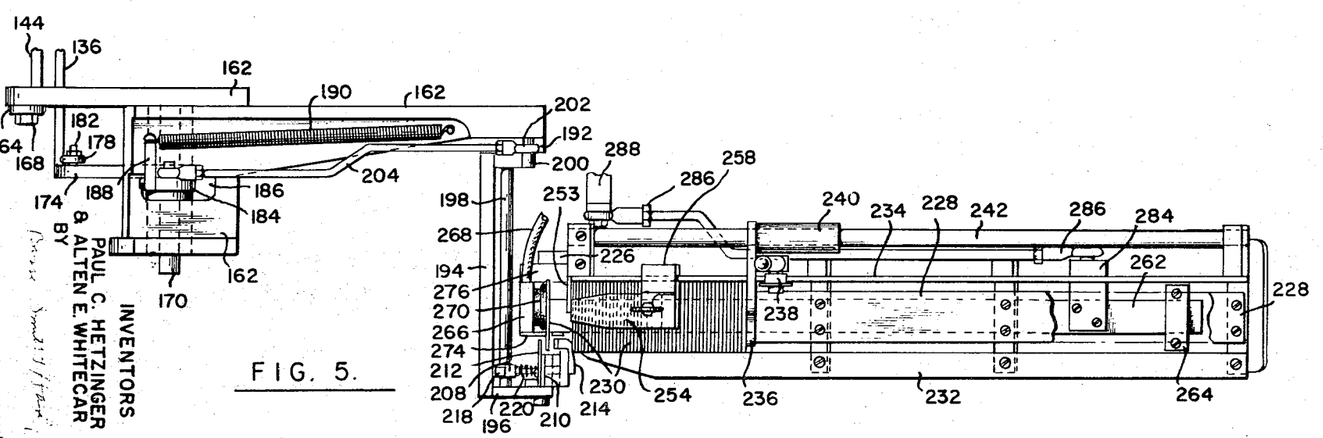
FIG. 5 is a plan view of the mechanism of FIG. 4.

As seen best in FIG. 6, member 136 is connected to arm 174 of bell crank 176 through link 178 pivoted to member 136 as at 180 and to arm 174 as at 182. Bell crank 176 is mounted for oscillation on shaft 170 with its other arm 184 passing upwardly through slot 186 in arm 162 (FIG. 5). Arm 184 is provided with a laterally extending member 188 (FIG. 5) to which is attached one end of extension spring 190, the other end of said spring being secured to arm 162 as shown, the purpose of which is to urge bell crank 176 in a clockwise direction as seen in FIGS. 4 and 6.

Figure 3:
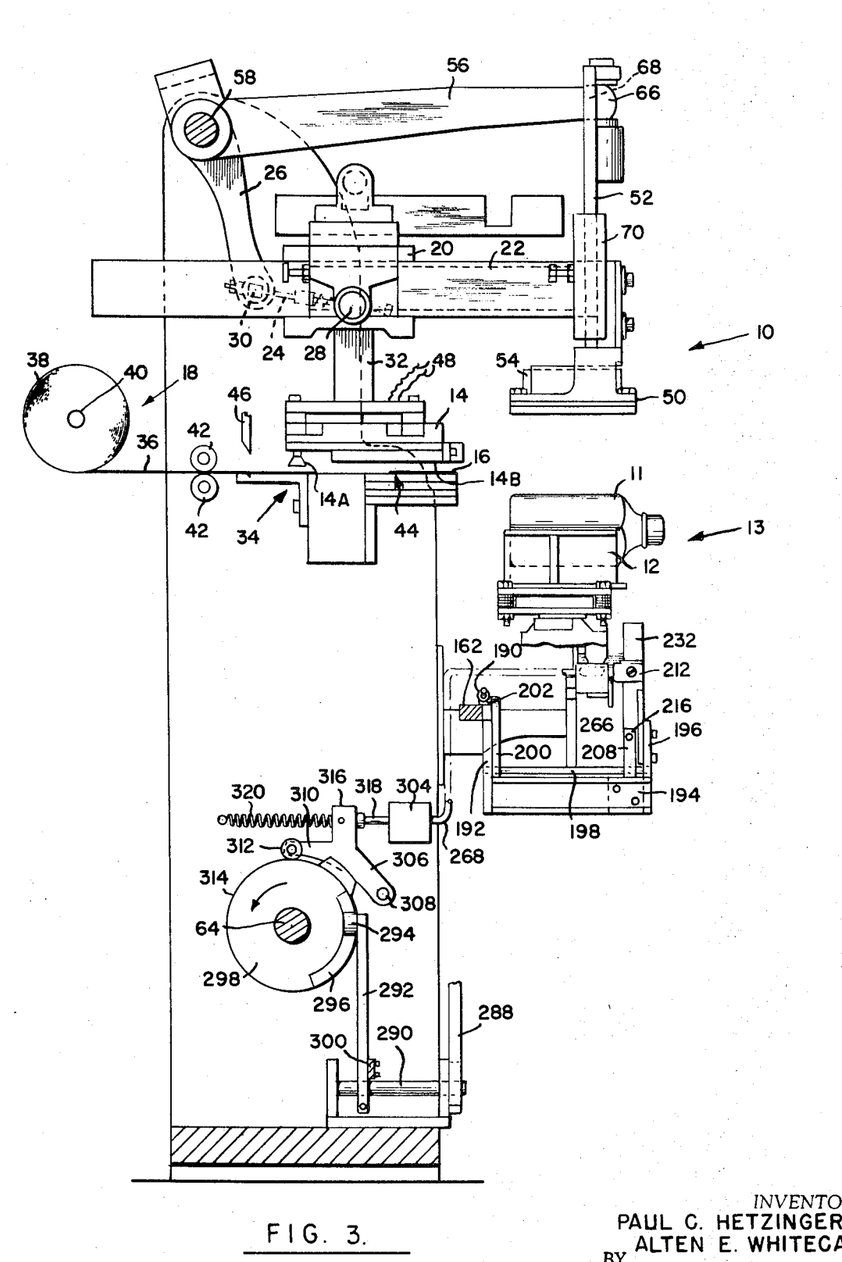
FIG. 3 is a vertical section of the machine of FIG. 1 with some parts omitted for better illustration.

Fixed to arm 162 and depending therefrom at its outer end is a support 192 to which is secured one end of a lateral member 194 (FIG. 5). Fixed to the other end of lateral member 194 is upwardly extending support 196. Journalled in supports 192 and 196 is shaft 198 having an upwardly extending arm 200 fixed thereon (FIGS. 3 and 5). Arm 200 is pivoted as at 202 to one end of rod 204. The other end of rod 204 is pivoted to arm 184 of bell crank 176 at 206.

Fixed on shaft 198 is a second upwardly extending arm 208.

Fixed to support 196 is an upwardly extending member 210 having a thin flat jaw member 212, such as of metal, affixed to the upper end thereof and extending inwardly beyond the edge of member 210 as seen in FIG. 5.

Jaw member 214 is pivoted intermediate in ends as at 216 to member 210, and has its lower end operatively connected to arm 208 as by bolt 218, a compression spring 220 carried on bolt 218 being interposed between arm 208 and jaw member 214.

Jaw member 214 is shown in open position in FIGS. 1, 4 and 5, and is moved between open and closed positions by oscillation of bell crank 176 on shaft 170, upward movement of link 178 closing the jaw and downward movement opening it.

Referring now to FIG. 2, it will be noted that downward movement of link 178 occurs when cam follower 126 is moved downwardly by cam 124, and upward movement of link 178 occurs when cam follower 126 moves upwardly as permitted by cam 124. Spring 190 is tensioned in the latter direction and serves to keep cam follower 126 in contact with cam 124.

It will also be noted that downward movement of link 178 tends to occur when cam follower 152 moves downwardly as permitted by cam 154, spring 156 being tensioned downwardly, and upward movement of link 178 tends to occur when cam follower 152 is moved upwardly by cam 154. The tendency for these latter movements of link 178 results from the mounting of member 136 on member 144 by means of member 150 on which member 136 is pivoted at 148, but are offset or compensated by the shape of cam 124. Link 178 in this and other respects is vertically actuated in operative synchronism by the means provided in suitable timed relationship with associated elements as will be brought out more fully hereinafter.

Arm 162 is oscillated on shaft 170 between the article receiving position or station illustrated in FIGS. 4 and 5 and the article delivery position or station illustrated in FIG. 6 by vertical reciprocation of link 164, downward movement of link 164 raising arm 162 from the article receiving position to the article delivery position, and upward movement of link 164 returning arm 162 to the article receiving position.

Vertical movement of link 164 is controlled by member 144, to which it is pivoted at 166, link 164 moving downwardly along with the end of member 144 when cam follower 152 moves downwardly as permitted by cam 154, and link 164 moving upwardly when cam follower 152 is moved upwardly by cam 154. Link 164 like link 178 is thus vertically actuated in operative synchronism by the means provided in suitable timed relationship with associated elements.

Reference will now be made to means for the feeding of articles successively to jaw members 210 and 214.

As seen in FIGS. 1, 4, 5 and 6 mechanism for the latter purpose is mounted on a frame 222 attached to the frame of machine 10 in any suitable manner such as by lateral support 224 and plate 226. Mounted on frame 222 is a plate 228 which carries articles 230, such as folded circulars. Guide bar 232 is mounted on frame 222 on one side of articles 230, and guide plate 234 on the other side of said articles. A follower 236 has a roller 238 which rides on the upper edge of guide plate 234 and is connected to a tubular member 240 slidably mounted on rod 242 which is supported by frame 222. Suitable means are provided to urge follower 236 against articles 230 in the magazine formed by bottom plate 228, side guide bar 232 and side guide plate 234. As shown, the outer end of said magazine is elevated sufficiently to cause follower 236 to slide by gravity on its supports downwardly against articles 230.

Any means may be provided for releasably holding articles 230 at the feeding end of the magazine containing the same and for keeping said articles in alignment. As shown, this comprises a lower leaf spring 252 for holding articles 230 downward in the magazine, lower spring strip 253 secured to side plate 234 and upper leaf spring 254 having its functioning end 256 turned slightly downward to engage the upper edge of the most advanced article 230 in the magazine, leaf springs 252 and 254 are shown mounted on block 258 secured to guide plate 234, the tension on leaf spring 254 being made adjustable by means of screw 260.

Slide 262 is mounted on frame 222 underneath plate 228 and is held in sliding position on frame 222 by means of guide members 264 which are notched on their undersides to accommodate slide 262 in guide sliding relationship. Slide 262 supports a manifold element 266 which is connected to a source of vacuum (subatmospheric pressure) by a line 268 and is provided with a suction cup 270 which is connected to the interior of the manifold 266.

Figure 7:
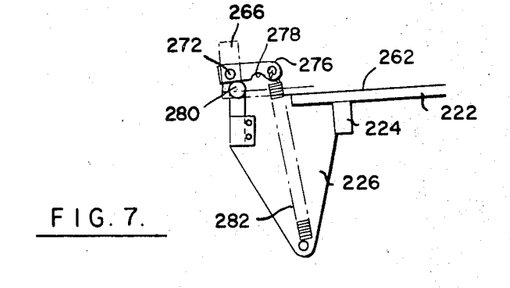
FIG. 7 is an elevation illustrating details of the finger mechanism of FIGS. 4 to 6 in the raised position.
Figure 8:
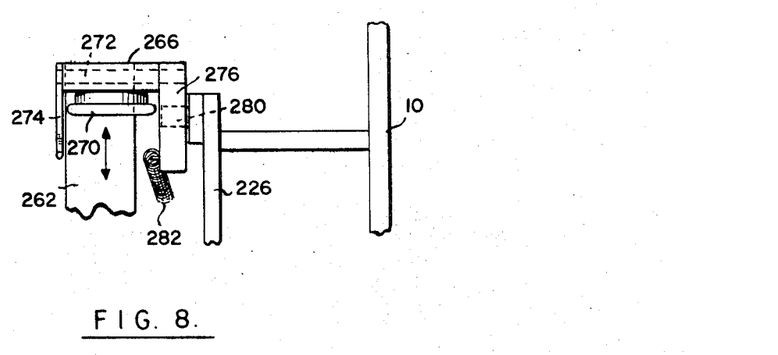
FIG. 8 is a fragmentary plan view of the mechanism of FIG. 7.

Shaft 272 passes through the solid lower portion of manifold 266. Shaft 272 has secured thereto at one end finger 274, and, as best seen in FIG. 7, at its other end a lever 276 having a notch 278. Roller 280 is rotatably mounted, such as on plate 226 as illustrated in FIGS. 7 and 8. Extension spring 282 connected to lever 276 and plate 226 holds lever 276 in operative engagement with roller 280. It will be noted that whereas the axis of roller 280 is fixed, that is immovable, cam follower 276, being mounted on slide 262, moves over the surface of roller 280 in a manner and for a purpose to hereinafter appear.

Bracket 284 secured to slide 262 is connected through rod 286 to arm 288 (see FIGS. 4 and 5) mounted on shaft 290, the latter journaled on the frame of machine 10, see FIGS. 1 and 3. Shaft 290 fixedly carries a second arm 292 having a cam follower 294 at its free end in operative engagement with cam surface 296 on the face of cam 298, the latter mounted on shaft 64 for rotation therewith. Attached to arm 292 is a laterally extending arm 300 to the free end of which is secured one end of an extension spring 302. The other end of spring 302 is secured to the frame of machine 10. Spring 302 holds cam follower 294 in operative engagement with cam surface 296.

As seen in FIG. 3, at 304 is shown a vacuum valve connected to a source of vacuum or reduced (sub-atmospheric) pressure not shown. Valve 304 is connected through tubular member or line 268 to manifold 266. Bell crank 306 is pivoted at 308 to the frame of machine 10, and has an arm 310 carrying a cam follower 312 at its free end. Cam follower 312 operatively engages cam surface 314 on the periphery of cam 298. The other arm 316 of bell crank 306 is in operative engagement with reciprocating actuating member 318 of valve 304. Cam follower 312 is held in operative engagement with cam surface 314 by means of extension spring 320 attached to arm 316 on one end and the frame of machine 10 on the other.

Operation

Figure 10:
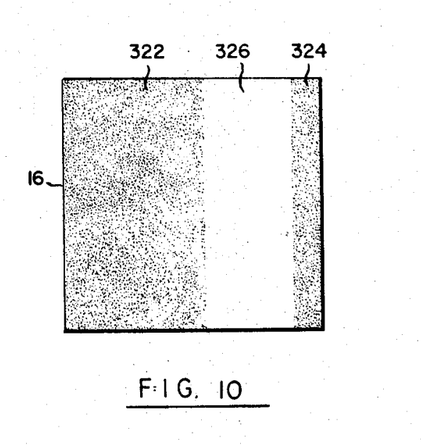
FIG. 10 is a view of the adhesive side of a label adapted to the practice of the invention.

The operation of a typical machine of the prior art has been described above. In the operation of an embodiment of the invention in connection with the above machine the adhesive on the lower surface of web 36 is arranged in spaced longitudinal stripes or bands as illustrated in FIG. 10, a broad band of adhesive being shown on label 16 at 322 and a narrow band at 324, with an adhesive-free band or stripe at 326. It will be seen, however, that the width of the adhesive-free band 326 is a matter of choice and judgment and the bands 324 and 326 may be joined in part if it is desired to form a pocket.

Since the adhesive-free band 326 runs lengthwise on the lower surface of web 36, this band on label 16 will run lengthwise, i.e. from left to right, of bottle 11 as seen in FIG. 3, or in other words will run uprightly of the bottle when the bottle is in normal upright position.

It is a primary purpose of this embodiment of the invention to deliver individual articles successively to the upper surface of successive containers 11 in appropriate position so that when label 16 is applied to the individual container, an article will be secured to the container underneath the adhesive-free band 326 of such label, so that it may be withdrawn at will.

Individual articles are successively received by arm 162 when successively in article receiving position in the following manner. In appropriate timed relationship cam follower 294 descends onto a lower portion of cam face 296 to rock arm 288 clockwise as seen in FIG. 1. This moves slide 262 to the right as seen in FIGS. 1, 4 and 5 to bring suction cup 270 into contact with the end article 230 in the magazine. In appropriate timed relationship cam surface 314 (FIG. 3) actuates valve 304 through bell crank 306 and cam follower 312 to apply suction to suction cup 270 causing the end article 230 to adhere thereto. On the return stroke of arm 288, due to cam follower 294 ascending onto a higher portion of cam face 296, slide 262 and suction cup 270 with said article adhering thereto move back to the left as seen in FIGS. 1, 4 and 5. On the forward movement of slide 262, that is the above mentioned movement to the left, lever 276 is moved upwardly on roller 280 to rock shaft 272 counterclockwise (FIG. 7) to bring finger 274 up against the rear face of the particular article 230 adhering to suction cup 270 to hold it against said suction cup, such as in the case of folded literature, to prevent unfolding. Upon the return movement of slide 262 to the right, as seen in FIGS. 1, 4 and 5, shaft 272 moves to the right of roller 280 and lever 276 moves clockwise (FIG. 7) descending around roller 280 to return finger 274 to its original position, its function having been taken over by the jaw comprised of jaw members 212 and 214, the jaw now being closed about the projecting edge of the particular article 230, and the suction on suction cup 270 released by appropirate operation of valve 304 by cam surface 314 and cam follower 312 through bell crank 306.

Closing movement of movable jaw member 214 is brought about by virtue of cam follower 126 coming into contact with an arc of lesser radius on cam 124 as previously brought out.

The individual article 230 now being firmly gripped between jaw members 210 and 214, the degree preferably being made adjustable at extension spring 190 and compression spring 220, upward movement of arm 162 may now take place. As previously brought out, this occurs when cam follower 152 descends onto an arc of lesser radius on cam 154.

Figure 9:
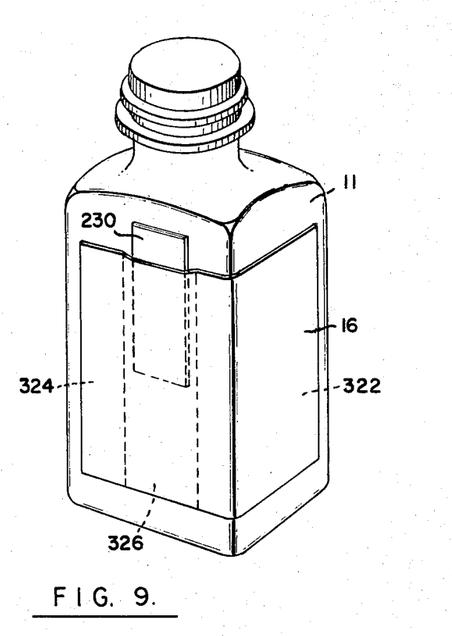
FIG. 9 is a perspective view of a container having an article secured thereto underneath a label.

Arm 162 is shown in article delivery position in FIG. 6. This position is so coordinated, for example by adjustment at link 164 and otherwise, with the position of the label on suction head 14 so that when the label is deposited by said suction head, the particular article 230 will occupy a position directly underneath the adhesive-free band 326 on said label. Resilient contact member or wiper 54 now comes into operation whereupon the label is firmly pressed into contact with the container, article 230 remaining in its position under band 326. During these operations jaw members 210 and 214 which grip the edge of the article 230 occupy a position out of the path of head 14 and wiper 54 and of the label being applied to the container with the result that the article, such as a piece of literature, projects beyond the applied label for ready removal as seen in FIG. 9.

Upon completion of the label wiping operation, arm 162 returns to its article receiving position and the cycle is repeated, an unlabeled container replacing the labeled container on support 12.

Jaw members 210 and 214 may have any desired shape consonant with the shape of the article and the container. When the article is flexible such as a piece of literature and the container surface against which the article is to be held is flat or curved, it is preferred to have the operative surfaces of the jaw members flat or similarly curved as the case may be, and also to have jaw member 210 relatively thin, particularly if occupying a container overlapping position when in article delivery position. This brings the article very close to the container surface during the label applying operation. Also it is preferred to position said last-mentioned surface tangent to the arcuate path of movement of the jaw. This is to reduce or eliminate chance disturbance of the article and label upon release and return of the jaw to article receiving position, although with modern adhesives wide latitude is afforded in this respect.

It is to be understood that while the invention has been described above in connection with the holding of an article on a container underneath an adhesively non-actuated band or stripe on the underside of a label so as to make the article readily removable, the invention is also useful for securing the article, if desired, such as a premium of money refund, by means of the adhesive in which case the band or stripe may be omitted.

Having particularly described an embodiment of the invention, it is to be understood that this is by way of illustration and not of limitation.

What is claimed is:

1. The combination with a labelling machine having means located at a labelling station for supporting an object to be labeled in a rest position, means for depositing an adhesively activated label on a surface of said object while said object is in a rest position, and pressure means operated at said labeling station to press said label in place on said surface, of a source of supply for an article to be held against said surface underneath said label and reciprocating means separate from said label depositing means constructed and arranged for back and forth movement between an article pickup position adjacent said source of supply and an article delivering position close to said surface receiving said label for conveying articles successively from said source of supply to a position close to said surface receiving said label prior to said depositing of said label on said surface and including a gripper means for gripping the article at said article pickup position and maintaining said grip on the article during movement to said article delivering position and during the application of said label to the object, said gripper means including a jaw positioned to grip an edge of an article, means for closing said jaw when in said article pickup position, and means for opening said jaw when in said article delivering position upon application of a label to the object.

2. The combination of claim 1 wherein said label has an adhesively non-activated band intermediate its adhesively activated area, and wherein said reciprocating means includes means for positioning said article underneath said adhesively non-activated band of said label.

3. The combination of claim 2 wherein said source of supply for an article is comprised of a magazine for a plurality of articles, wherein a suction head is reciprocably mounted on said magazine and adapted upon reciprocation for removing an article from said magazine, wherein means are provided for reciprocating said suction head, and wherein said gripper means of the reciprocating means for conveying an article to a position close to the surface of the object is arranged for successively picking up articles from said suction head.

4. The combination of claim 3 including a source of suction for said suction head, a valve between said source of suction and said suction head to apply suction to said suction head and to release suction on the head, and means for operating said valve.

5. The combination of claim 3 wherein said magazine is adapted for holding folded literature articles, and wherein means are provided for holding each said article in folded condition between removal from said magazine by said suction head and its pickup by said jaw.

References Cited

UNITED STATES PATENTS 3,440,116   4/1969   Whitecar ____________ 156—70

JOHN T. GOOLKASIAN, Primary Examiner

H. F. EPSTEIN, Assistant Examiner

U.S. Cl. X.R.

53—50; 93—8; 156—521, 556, 564, 572, 573